(12) United States Patent
Orr

(10) Patent No.: US 9,380,841 B2
(45) Date of Patent: Jul. 5, 2016

(54) ZIPPER ASSEMBLY AND METHOD OF USE THEREOF

(71) Applicant: Mark W Orr, Arvada, CO (US)

(72) Inventor: Mark W Orr, Arvada, CO (US)

( * ) Notice: Subject to any disclaimer, the term of this patent is extended or adjusted under 35 U.S.C. 154(b) by 0 days.

(21) Appl. No.: 14/210,769

(22) Filed: Mar. 14, 2014

(65) Prior Publication Data

US 2014/0182091 A1    Jul. 3, 2014

Related U.S. Application Data

(62) Division of application No. 13/758,048, filed on Feb. 4, 2013, now Pat. No. 8,701,266.

(60) Provisional application No. 61/597,242, filed on Feb. 10, 2012.

(51) Int. Cl.
| | |
|---|---|
| *A44B 19/40* | (2006.01) |
| *F16P 1/00* | (2006.01) |
| *A44B 19/30* | (2006.01) |
| *E04G 21/32* | (2006.01) |
| *A44B 19/24* | (2006.01) |

(52) U.S. Cl.
CPC .................. *A44B 19/40* (2013.01); *A44B 19/24* (2013.01); *A44B 19/30* (2013.01); *E04G 21/3266* (2013.01); *F16P 1/00* (2013.01); *Y10T 24/2507* (2015.01); *Y10T 24/2511* (2015.01); *Y10T 29/49718* (2015.01); *Y10T 29/49947* (2015.01); *Y10T 29/49995* (2015.01); *Y10T 428/24008* (2015.01)

(58) Field of Classification Search
CPC ...... A63B 2208/12; A63B 5/11; A47B 97/00; A47F 5/01; A44B 19/24; A44B 19/40
See application file for complete search history.

(56) References Cited

U.S. PATENT DOCUMENTS

| | | | |
|---|---|---|---|
| 5,601,198 | A | 2/1997 | Reed |
| 5,791,501 | A | 8/1998 | Baldwin, Jr. |
| 6,345,944 | B1 | 2/2002 | Florence |
| 7,708,667 | B2 | 5/2010 | Alexander |
| 7,909,703 | B1 | 3/2011 | Semrau |
| 2002/0144965 | A1 | 10/2002 | Calleja |
| 2002/0144966 | A1 | 10/2002 | Calleja |
| 2005/0079954 | A1 | 4/2005 | Wang |
| 2005/0217026 | A1 | 10/2005 | Ramirez |
| 2008/0009374 | A1 | 1/2008 | Valdez |
| 2008/0129166 | A1 | 6/2008 | Benneche |
| 2008/0269020 | A1 | 10/2008 | Alexander |
| 2010/0102015 | A1 | 4/2010 | Benneche |

*Primary Examiner* — Moshe Wilensky
(74) *Attorney, Agent, or Firm* — Leyendecker & Lemire LLC

(57) ABSTRACT

A zipper assembly is described wherein the facing tapes having interlocking teeth along facing edges each have a plurality of eyelets distributed longitudinally therein. The eyelets permit the receipt of zip ties therethrough for securing the assembly to an opening in a net. When installed a user may selectively open and close the opening by zipping and unzipping the zipper assembly.

6 Claims, 2 Drawing Sheets

ZIPPER ASSEMBLY AND METHOD OF USE THEREOF

BACKGROUND

In warehouse and other industrial settings, industrial netting is often used to protect an area below the netting from debris that may fall from above the netting. As can be appreciated without such netting items could fall from shelving on to a hard concrete floor and shatter. Worse yet, a person in the vicinity of the falling object could be hit and injured. Industrial netting serves an important and often necessary workplace safety function.

Unfortunately, in addition to catching heavy objects, the netting also catches lightweight objects, such as boxes, cardboard box dividers and paper. Over time this largely innocuous debris can accumulate on the netting and obscure the clear view from below. Current standard practice in these circumstances is to cut an opening in the netting and reach through and remove the debris. Often these openings are not repaired and over time a number of openings can act to compromise the integrity in the netting. Repairing the netting when done often comprises tying the opening shut with twine or string. This process of repair can be time consuming and does not permit easy access to the top of the net the next time debris needs to be removed.

DETAILED DESCRIPTION

Embodiments of the present invention comprise a zipper assembly that can be installed into a net, such as industrial netting. The installation of an assembly repairs an opening cut into the netting to remove debris and provides a means for future access without having to make new cuts.

Terminology

The terms and phrases as indicated in quotes (" ") in this section are intended to have the meaning ascribed to them in this Terminology section applied to them throughout this document including the claims unless clearly indicated otherwise in context. Further, as applicable, the stated definitions are to apply, regardless of the word or phrase's case, to the singular and plural variations of the defined word or phrase.

The term "or" as used in this specification and the appended claims is not meant to be exclusive rather the term is inclusive meaning: either or both.

References in the specification to "one embodiment," "an embodiment," "an alternative embodiment," and similar phrases mean that a particular feature, structure, or characteristic described in connection with the embodiment is included in at least an embodiment of the invention. The appearances of the phrase "in one embodiment" in various places in the specification are not necessarily all meant to refer to the same embodiment.

The terms "couple" or "coupled," as used in this specification and the appended claims, refers to either an indirect or direct connection between the identified elements, components or objects. Often the manner of the coupling will be related specifically to the manner in which the two coupled elements interact.

The term "removable," "removably coupled," "readily removable," "threadably coupled," and similar terms, as used in this specification and appended claims, refer to structures that can be uncoupled from an adjoining structure with relative ease (i.e., non-destructively and without complicated or time consuming process), and can also be readily reattached or coupled to the previously adjoining structure.

Directional and/or relationary terms such as, but not limited to, left, right, top, bottom, vertical, horizontal, back, front and lateral are relative to each other and are dependent on the specific orientation of an applicable element or article, and are used accordingly to aid in the description of the various embodiments and are not necessarily intended to be construed as limiting.

As applicable, the terms "about" and "generally" as used herein unless otherwise indicated mean a margin of +−20%. Also, as applicable, the term "substantially" as used herein unless otherwise indicated means a margin of +−10%. Concerning angular measurements, "about" or "generally" refer to +−10 degrees and "substantially" refers to +−5.0 degrees unless otherwise indicated. It is to be appreciated that not all uses of the above terms are quantifiable such that the referenced ranges can be applied.

A Net Zipper Assembly

Figure 1:
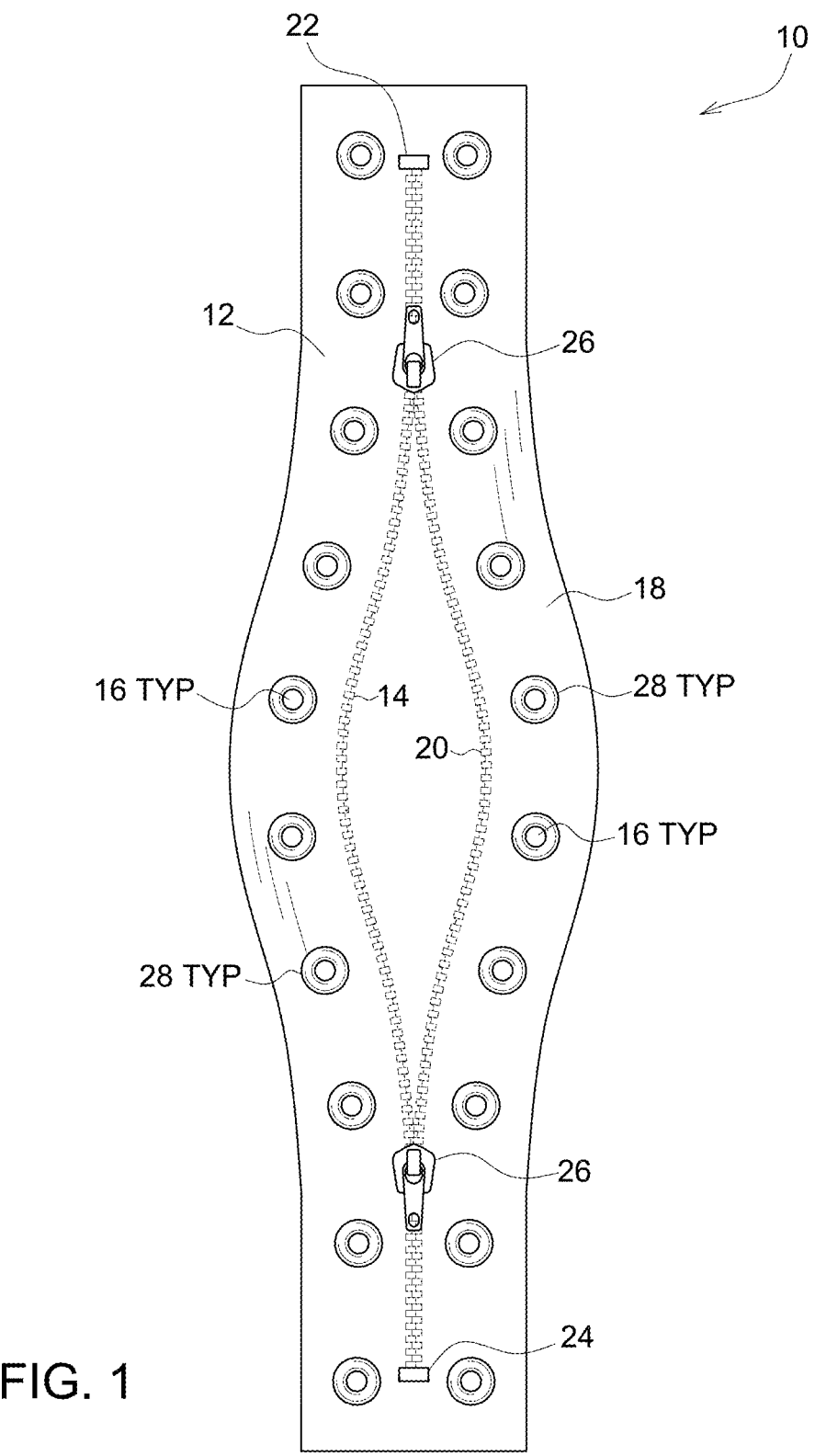
FIG. 1 is an isometric top view of a net zipper according to one embodiment of the present invention.

An embodiment of a typical net zipper assembly 10 is illustrated in FIG. 1. The assembly has: (i) a left tape 12 with zipper teeth 14 disposed along a right edge and a plurality of eyelets 16 spaced along the length of the tape; (ii) a right tape 18 with zipper teeth 20 disposed along a left edge and a plurality of eyelets 16 spaced along the length of the tape; top and bottom stops 22 & 24 adjoining the left and right tapes; and one or two slides 26 (or zipper pulls) received over the teeth of both the left and right tapes to effectively open and close the zipper.

The tape 12 & 18 typically comprises a woven material imparting flexibility and strength. A tape is usually 0.5" to 2.0 inches wide but other widths can be utilized as well depending on the application. The length of the tape varies depending on application as well but lengths between one to three feet are most typical. The eyelets 16 are usually evenly spaced every 1-3" along the length of each tape usually proximate the widthwise center thereof. The diameter of the eyelets can vary as well depending on the size of fastener to be received therethrough. Metal or plastic grommets 28 are provided for each eyelet to reinforce it and prevent the fraying of the tape at the eyelet.

In variations, the tape can be made of a non-woven fabric or even a flexible sheet material. In one variation wherein the tape is a polymeric sheet material, such as thermoplastic nylon or polyethylene, the eyelets may be formed therein using a heated mandrel to puncture the sheet. This process often results in thicker edge of material being deposited around the eyelet perimeter upon cooling of the molten plastic. In this variation, grommets may not be required to protect and reinforce the eyelets. In yet other variations using sheet material, the strength of the material may be such that grommets are not required even if the eyelets are formed by other means, such as stamping or drilling.

Standard interlocking rows of zipper teeth 14 & 20 are provided along facing edges of the tapes 12 & 18. The teeth are typically comprised of metal or plastic and are disposed to align with facing teeth in a locked configuration to selectively join the left and right tapes together substantially along their entire lengths. At least one zipper pull 26 (or slider) is provided to alternatively interlock and unlock the facing rows of teeth depending on the direction the slider is moved. Two sliders are illustrated in the figures, although versions with only a single slider are also contemplated.

At respective top and bottom ends of the tapes at the top and bottom termini of the respective rows of teeth, stops 22 & 24 are provided. The stops are typically mechanically coupled with the corresponding and facing edges of the left and right tapes to join the tapes together at these locations. In one variation the stops comprise metal strips with several pointed teeth on each end. The teeth puncture the fabric at the respective edges then are folded over to secure the stop in place.

Running longitudinally proximate a widthwise center of each tape are the plurality of eyelets 16. Each eyelet is typically spaced 1"-3" from each other along substantially the entire length of the tape with the spacing dependent on the type of net the zipper assembly is to be installed. The diameter of the eyelets can vary with the width of the tape and the size of zip or cable ties to be received therethrough. Eyelet grommets 28 are provided around each eyelet to reinforce it. The grommets are typically comprised of metal but can also be made of plastic.

Installation of a Net Zipper Assembly

Figure 2:
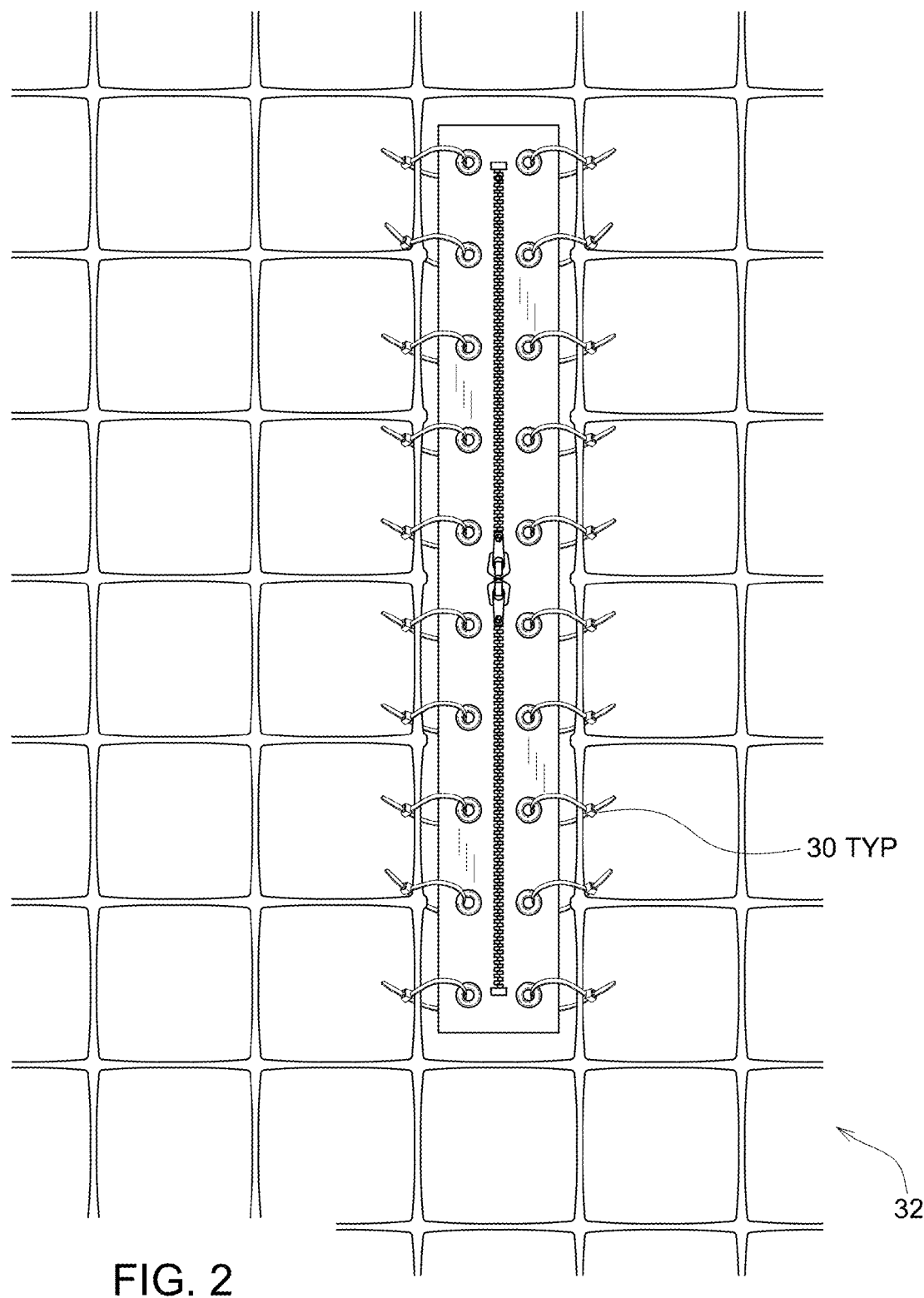
FIG. 2 is an isometric top view of the net zipper assembly installed in a net according to one embodiment of the present invention.

Referring primarily to FIG. 2 the installation of a net zipper assembly 10 in an industrial net is described. Initially, an opening is cut into the netting typically by making a linear slice of a desired length. The reason for cutting the opening can vary. The opening may be cut to remove debris from above the net or the opening may be cut to specifically install the net zipper assembly. The opening may be preexisting from an earlier cleanout of debris from above the net. If the net opening is preexisting, the installer will typically select a zipper assembly similar to the length of the opening; whereas, if the opening is being cut to install the zipper assembly, its length will usually be cut to correspond to zipper assemblies on hand.

The zipper assemble is then placed within the opening and secured in placed by threading zip ties or other suitable fasteners through the eyelets, around a string of the net bounding the opening and through the ratchet mechanism at the opposing end and head of the tie. The tie is then tightened in place with the excess tie being optionally cut off or otherwise removed.

As desired the top side of the net can be accessed by opening the zipper assembly by pulling the slide(s) in the appropriate direction. Thereafter, the zipper can be closed eliminating any weakness in the net that could affect its ability to catch larger heavier items should they fall from locations above.

OTHER VARIATIONS AND ALTERNATIVE EMBODIMENTS

Various features on the net zipper assembly can vary. For instance the tape can be comprised of a sheet material instead of a fabric. Other types of connectors can be used in place of zip ties, such as but not limited to twist ties and rope or twine. In yet another variation, the zipper itself is replaced with hook and loop material or even some other joining mechanism, such as snaps or buttons.

The zipper assembly is described specifically in use with industrial netting especially in warehouse settings. However, variations and other embodiments can be used in any application where an opening in a net is required. Furthermore, use of the invention is not limited to just nets, but rather any flexible sheet material in which access from one side to the other through an opening in the sheet material would be desirable.

I claim:

1. A combination comprising:
a net including yarns; and
a zipper assembly, the zipper assembly including,
   a first flexible tape having left and right longitudinal sides, the left longitudinal side including a left row of zipper teeth disposed thereon,
   a second flexible tape having left and right longitudinal sides, the right longitudinal side including a right row of zipper teeth disposed thereon, the right row being substantially aligned with the left row,
   at least one zipper slide received over both the left and right rows for slidable movement there along with movement in one direction interlocking the teeth of the left and right rows together and in an opposite direction releasing the interlocked teeth,
   a first zipper stop adjoining the first and second tapes proximate a top end of the left and right rows,
   a second zipper stop adjoining the first and second tapes proximate a bottom end of the left and right rows,
   a first row of spaced eyelets distributed longitudinally along the first tape, and
   a second row of spaced eyelets distributed longitudinally along the second tape; and
wherein the zipper assembly is installed in an opening in the net with a plurality of connectors, each connectors passing through an eyelet and around one or more yarns of the next.

2. The zipper assembly of claim 1, wherein the first and second flexible tape each comprise a fabric material.

3. The zipper assembly of claim 1, wherein the width of each of the first and second flexible tapes is between 0.50" and 2.0".

4. The zipper assembly of claim 1, comprising two zipper slides.

5. The combination of claim 1, wherein the plurality of connectors comprise zip ties.

6. A combination comprising:
a zipper assembly including,
   a first flexible tape having left and right longitudinal sides, the left longitudinal side including a left row of zipper teeth disposed thereon,
   a second flexible tape having left and right longitudinal sides, the right longitudinal side including a right row of zipper teeth disposed thereon, the right row being substantially aligned with the left row,
   at least one zipper slide received over both the left and right rows for slidable movement there along with movement in one direction interlocking the teeth of the left and right rows together and in an opposite direction releasing the interlocked teeth,
   a first zipper stop adjoining the first and second tapes proximate a top end of the left and right rows,
   a second zipper stop adjoining the first and second tapes proximate a bottom end of the left and right rows,
   a first row of spaced eyelets distributed longitudinally along the first tape, and
   a second row of spaced eyelets distributed longitudinally along the second tape;
a plurality of zip ties; and
a net, the zipper assembly being connected to the net by way of the zip ties received through the eyelets and around yarns of the net.

\* \* \* \* \*